United States Patent [19]

Compton

[11] 4,235,397
[45] Nov. 25, 1980

[54] FLOW DEFLECTOR BLADES

[75] Inventor: Christopher J. Compton, Hatfield, England

[73] Assignee: British Aerospace, Weybridge, England

[21] Appl. No.: 33,714

[22] Filed: Apr. 26, 1979

[30] Foreign Application Priority Data

Apr. 29, 1978 [GB] United Kingdom ............... 17156/78

[51] Int. Cl.³ .......................... B64C 3/48; B64C 15/02
[52] U.S. Cl. ..................................... 244/12.5; 60/230; 244/23 D; 244/219; 416/23; 416/240
[58] Field of Search ....................... 244/12.5, 23 D, 52, 244/219; 416/23, 24, 132, 240; 239/265.19; 60/229, 230

[56] References Cited

U.S. PATENT DOCUMENTS

| 1,379,921 | 5/1921 | Holle | 244/219 |
| 2,429,665 | 10/1947 | Biermann | 416/132 |
| 3,704,828 | 12/1972 | Studer et al. | 244/219 X |
| 4,000,868 | 1/1977 | Gregor | 244/12.5 |

FOREIGN PATENT DOCUMENTS 2415172 10/1975 Fed. Rep. of Germany ........... 244/219

Primary Examiner—Barry L. Kelmachter
Attorney, Agent, or Firm—Cushman, Darby & Cushman

[57] ABSTRACT

A flow deflector blade primarily for mounting within the efflux of an aircraft propulsion fan so that a change of flow direction can be effected, includes a leading edge member, a trailing edge member, a leaf spring member of arcuate form connecting the two, and filler portions of rubber bonded to each side of the leaf spring member shaped to provide a desired blade contour.

6 Claims, 4 Drawing Figures

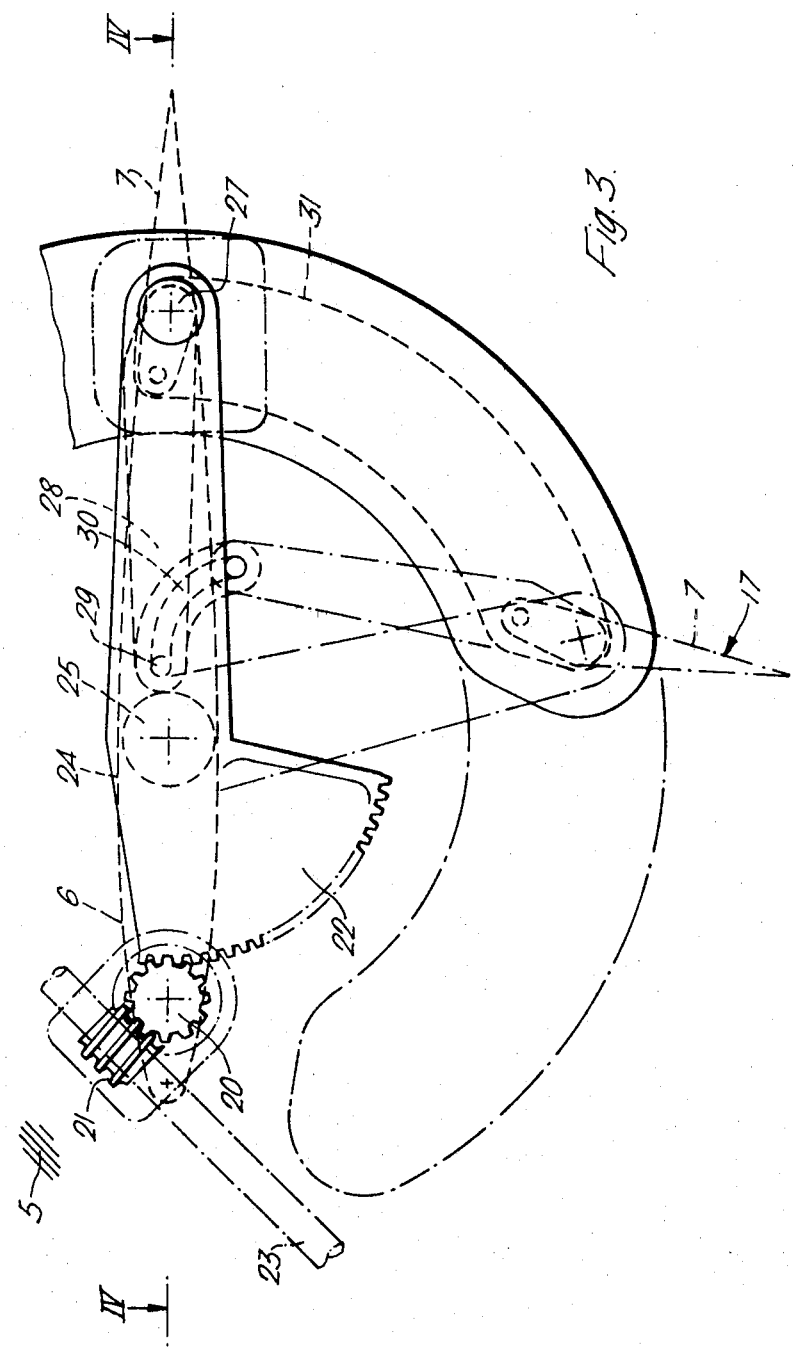

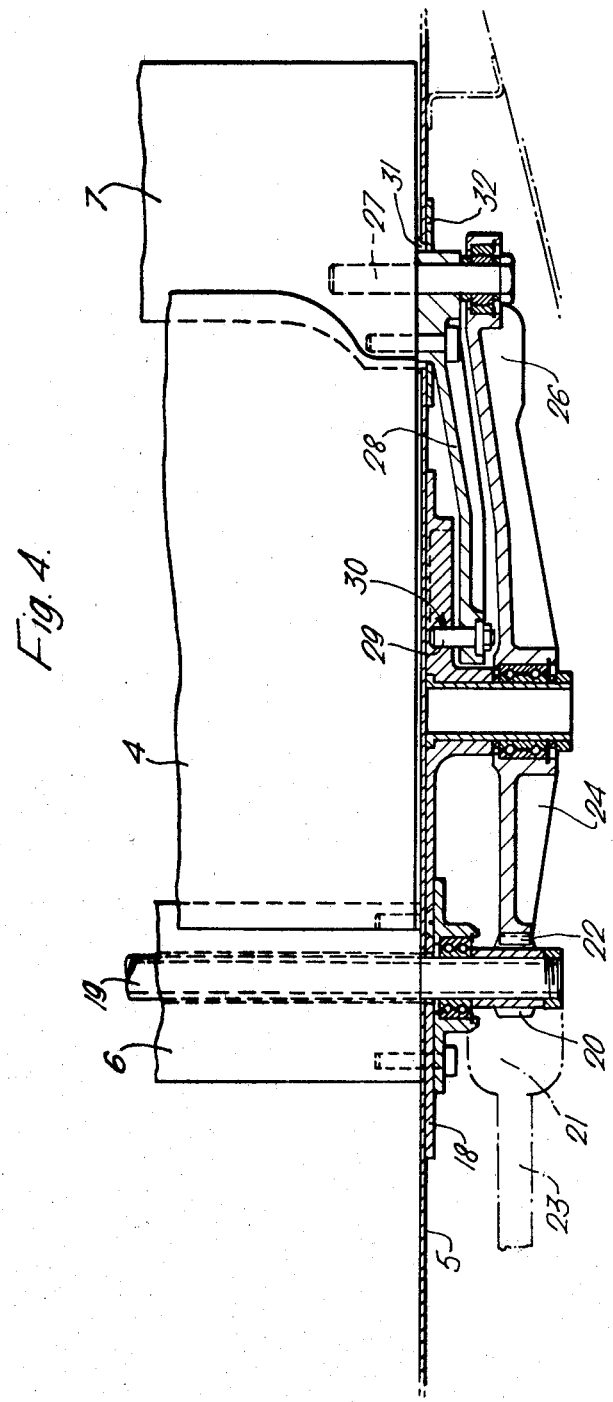

4,235,397

FLOW DEFLECTOR BLADES

This invention relates to resiliently deformable flow deflector blades for directing the flow of a fluid stream.

Such blades can be mounted within that fluid stream formed by the efflux of an aircraft propulsion fan so that a change of direction of the flow can be effected for propulsive thrust, lift thrust, or a combination of the two.

British Pat. No. 1,468,281 (Dornier System) discloses such a flow deflector blade in which a rigid nose part is connected by a skeletal frame of resilient material to a rigid trailing edge part, the profile shape being provided by flexible skins lying on respective sides of the skeletal frame and extending between the nose and trailing parts, and bearing members extending between the skins and the skeletal frame.

Such a construction is complex and accordingly is expensive to manufacture and, moreover it is considered to be susceptible to flutter, that is to say high frequency oscillation, when placed in an airstream.

The present invention has for an objective a blade construction which is relatively cheap to produce and which is sufficiently rigid to ensure flutterless operation.

According to the present invention, a resiliently deformable flow deflector blade includes a leading edge member, a trailing edge member, a leaf spring member connecting the two, and filler portions sandwiching the leaf spring member shaped to provide a desired external contour, the leaf spring member being formed to provide stiffness both when the blade is undeformed and deformed, and the filler portions being of a rubber or rubber-like material to adopt alternative desired contours when the blade is deformed.

Preferably the leaf spring member is of arcurate form both when the blade is undeformed and deformed.

Preferably the filler portions are of a soft rubber material bonded to the leaf spring member.

One preferred embodiment of the invention is described with reference to the accompanying drawings in which:

FIG. 3 is a side view of an actuation mechanism for each blade viewed along the span of a blade, and FIG. 4 is a cross section through line IV-IV of FIG. 3.

Figure 1:
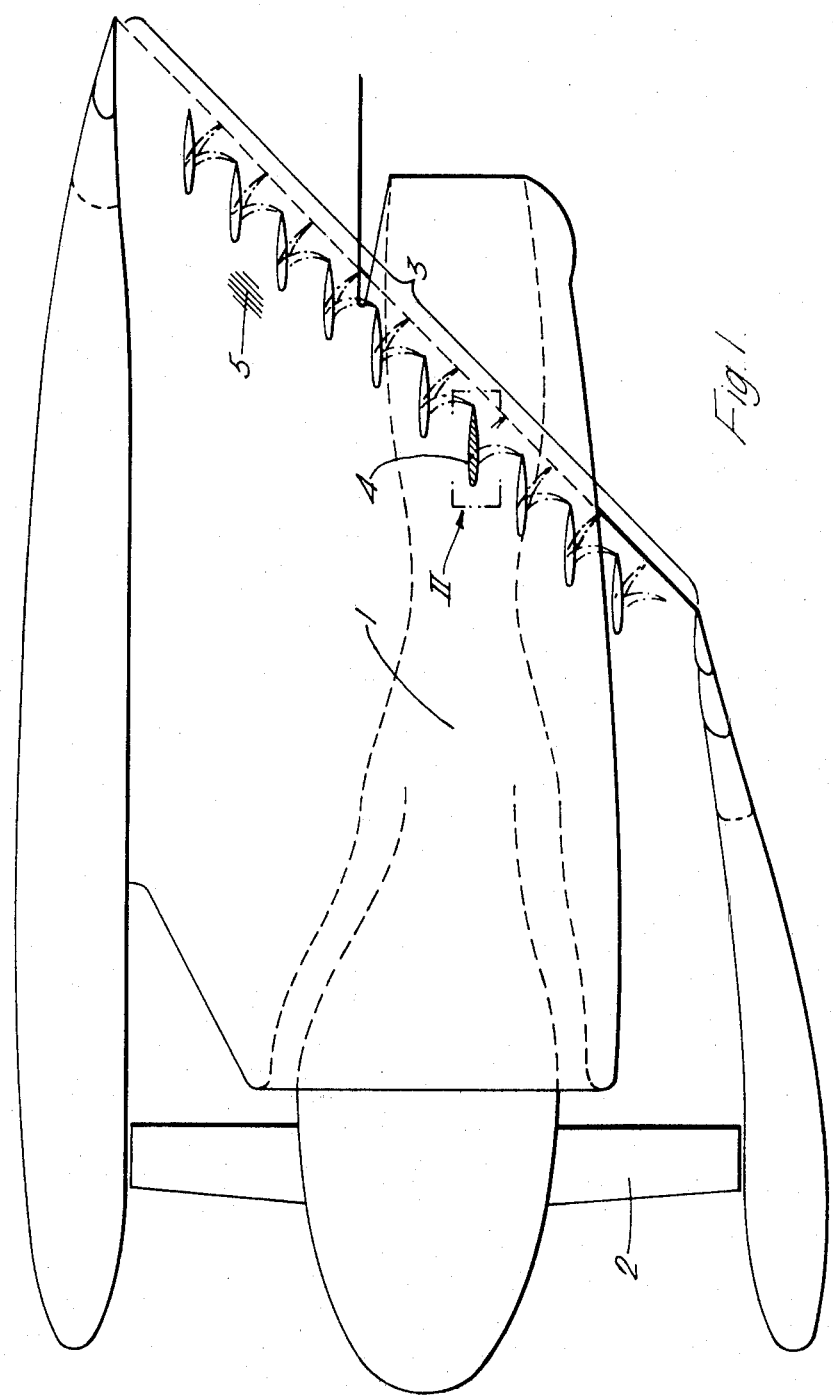
FIG. 1 is a reduced scale longitudinal cross-section through an aircraft power plant suitable for generating both propulsive and lift thrust and including flow deflector blades.

In FIG. 1, an aircraft power plant includes a gas generator 1 driving a ducted fan 2, the efflux from which exhausts through an outlet 3. The efflux can exhaust rearwardly (i.e. to the right of the drawing) for propulsion purposes or it can be deflected downwardly through a lower cutaway region (i.e. towards the bottom of the drawing) for lift purposes. Combined propulsion and lift thrust can be provided as also can a measure of reverse thrust. To effect the necessary changes in efflux direction a staggered series of flow deflector blades 4 extending between opposed walls 5 of the outlet 3 are provided. Assuming an aircraft carrying the power plant is in a straight and level flight attitude, each blade 4 lies transverse to the efflux flow with its spanwise plane horizontal. In the vicinity of the blades, the opposed walls 5 are disposed vertically to facilitate blade mounting and actuation.

Figure 2:
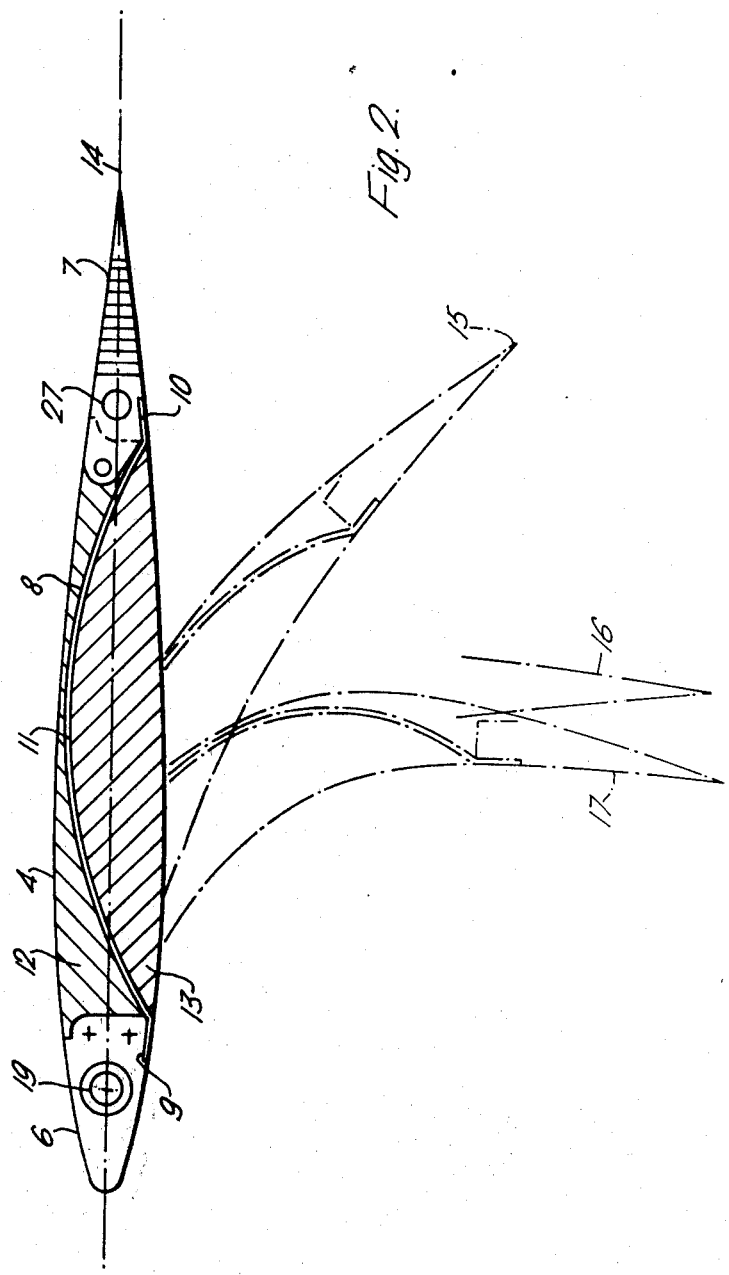
FIG. 2 is a view of the area within box II of FIG. 1 with a typical flow deflector blade shown in one condition in hard outline and in other conditions in broken outline.

Each blade 4 is resiliently deformable and to provide such a characteristic they are each similarly formed, as shown in FIG. 2, with a leading edge member 6 of rigid material, a trailing edge member 7 also of rigid material spaced from the leading edge member, and, inter-connecting the two, a leaf spring member 8 of spring steel sheet material. The leaf spring member 8 is connected to a lower region 9 of the leading edge member 6 and to a lower region 10 of the trailing edge member 7 and is contoured to curve upwardly between the leading and trailing edge members such that an intermediate region 11 lies adjacent an upper region of the blade. This curvature provides sufficient stiffness to prevent flutter when the blade is undeformed but also readily allows deformation of the blade to be effected. To provide the blade with desired aerofoil contours both before and after deformation, the leaf spring member 8 is sandwiched between upper and lower filler portions 12 and 13 respectively, which extend in a fore and aft direction to contact both the leading and trailing edge members 6 and 7. The portions are of soft rubber and are bonded to the members 6, 7 and 8.

The leading edge member 6 is anchored at its spanwise extremities to the walls 5 of the outlet whilst the trailing edge member 7 is carried, also at its spanwise extremities, by a deformation mechanism which effects deformation by bodily moving and simultaneously tilting the trailing edge member 7 downwards. FIG. 2 shows the deformed condition of the blade in broken outline. From the condition shown in hard outline, where the blade is symmetrically contoured about a datum plane 14 and causes no deflection of the efflux since this datum plane lies horizontally, the blade can be deformed through an intermediate condition or conditions of which one is shown at 15 where combined propulsive and lift thrust is obtained, to a condition 16 where substantially all the efflux is contributing to lift thrust. A further condition 17 (shown also in FIG. 3) guides the efflux through an angle greater than 90° measured from the datum plane 14 to provide a measure of reverse thrust.

The deformation mechanism comprises, for each blade 4, two identical but oppositely handed assemblies carried by a respective wall 5 outboard of each spanwise blade extremity. Each assembly is carried upon a base plate 18 which lies adjacent the outboard face of each wall 5. Both assemblies are cross coupled by a spanwise extending shaft 19 housed within a tube formed in the leading edge member 6 and rotatably carried by the base plates 18. For clarity only a left hand assembly of the deformation mechanism is illustrated and described with reference to FIGS. 3 and 4.

The shaft 19 carries a gear wheel at its extremity outboard of the illustrated base plate 18. This gear wheel 20 meshes both with a worn gear 21 and with an arcuate rack 22, the worm gear 21 being driven by a shaft 23 providing power input and the arcuate rack being formed upon a rocker member 24. That gear wheel 20 associated with the right hand extremity of the shaft 19 (not shown) may also be driven by a worm gear and shaft similar to those referenced 21 and 23 so that continuity of drive is ensured in the event of failure of one power input train.

The rocker member 24 is carried on a spanwise stub shaft 25 (for limited rotation about a first blade spanwise axis) and has at its end 26 remote from the rack 22 a self-aligning bearing within which engages a spanwise extending spigot 27 (lying on a second spanwise axis) rigidly carried by the trailing edge member 7 and projecting forwardly inboard of the base plate 18 is an orientation control arm 28. The forward end of this arm 28 is provided with a spanwise extending peg 29 which engages in an arcuate cam track 30 formed in the base plate 18 aft of the stub shaft 25 such that as the trailing edge member 7 is depressed by pivotal movement of the rocker member 24 about its stub shaft 25 as driven by the gear wheel 20 and the rack 22, the cam track and peg arrangement 29, 30 simultaneously causes the trailing edge member 7 and its spigot 27 to be tilted about the rocker member 24 in the self-aligning bearing. This angular re-orientation of the trailing edge is arranged to cause the deformed blade 4 to adopt desired contours in the various positions 15, 16 and 17 to which reference has been previously made.

The spigot 27 and the orientation control arm 28, being rigidly attached to the trailing edge member 7, protrude through an arcuate aperture 31 formed in the adjacent sidewall 5 to be connected to their associated mechanism. This aperture is closed by an arcuate closure plate 32 movable with the trailing edge member 7.

To reiterate, rotation of the input shaft 23 causes rotation of the spanwise shaft 19 and thus tilting the rocker member 24 about its stub shaft 25. This causes the trailing edge member 7 to be moved bodily downwards relative to the fixed leading edge member 6 in an arcuate path constrained by the rocker member 24, the leaf spring member 8 deflecting from its initial shape of shallow curvature to shapes of progressively deepening curvature. The filler portions 12 and 13, being of soft rubber, naturally deform to accommodate this deflection, the desired aerofoil contours being finally ensured by the angular re-orientation of the trailing edge member 7 with respect to the rocker member 24 as the peg 29 travels along the camtrack 30 to angularly tilt the arm 28.

The deformation mechanism is described in relation to a single blade 4 for ease of description, but each blade is similarly equipped and operated. The various mechanisms can be inter-connected for simultaneous or sequential operation.

I claim:

1. A resiliently deformable flow deflector blade including a first surface, a second surface facing generally opposite to said first surface, a leading edge member, a trailing edge member, a leaf spring member connecting the leading edge member and the trailing edge member, and filler portions sandwiching said leaf spring member and shaped to provide a desired external contour at said first and second surfaces when the blade is undeformed, said leaf spring member comprising a leading region connected to said leading edge member near said first surface of said blade, a trailing region connected to said trailing edge member near said first surface, and an intermediate region between said leading region and said trailing region with said leaf spring being of arcuate form so that both when the blade is undeformed as well as deformed, said intermediate region will always lie adjacent said second surface of said blade, said filler portions being of a rubber material to adopt alternative desired contours when said blade is deformed.

2. A flow deflector blade according to claim 1 wherein the leaf spring member is of a spring steel material.

3. A flow deflector blade according to claim 1 wherein the filler portions are of soft rubber bonded to the leaf spring member.

4. An aircraft jet propulsion power plant including at least one flow deflector blade according to claim 1.

5. An aircraft power plant according to claim 4 including a fixed region and a blade deformation mechanism, the leading edge member of the blade being anchored to the fixed region and the trailing edge member being carried by the deformation mechanism.

6. An aircraft power plant according to claim 5 wherein the blade deformation mechanism includes a rocker member capable of limited rotation about a blade spanwise axis, pivot means pivotally connecting the trailing edge member to the rocker member about a second spanwise axis, an orientation control arm having one end secured for limited bodily arcuate movement to the fixed portion of the power plant, and having its other end anchored to the trailing edge member of the blade so that said member is tilted about the second axis as blade deformation takes place.

* * * * *